United States Patent

Shibata

[11] 3,715,070
[45] Feb. 6, 1973

[54] COLD WELDING MACHINE
[75] Inventor: Akira Shibata, Yokohama, Japan
[73] Assignee: Chugai Denkikogyo Kabushiki Kaisha, Tokyo, Japan
[22] Filed: Dec. 1, 1970
[21] Appl. No.: 94,026

[30] Foreign Application Priority Data

Dec. 12, 1969  Japan..................................44/99972

[52] U.S. Cl. ....................228/44, 29/497.5, 219/91, 219/110, 228/3
[51] Int. Cl. ............................................B23k 19/00
[58] Field of Search ......228/3, 4, 44, 24; 219/85, 86, 219/78, 110, 91; 29/497.5; 148/127

[56] References Cited

UNITED STATES PATENTS 2,862,100   11/1958   Jones......................................219/86
2,401,528   6/1948    Vong......................................219/86

Primary Examiner—J. Spencer Overholser
Assistant Examiner—R. J. Craig
Attorney—Pierce, Scheffler & Parker

[57] ABSTRACT

A cold welding machine which includes a special transformer adapted to carry out two functions, one of which is the upsetting of metal pieces to be bonded, and the other of which is the releasing of stress or strain caused by the pressure applied to the metal pieces by the hammering member, the strain being released by the electric current in the secondary winding of the special transformer.

4 Claims, 1 Drawing Figure

PATENTED FEB 6 1973
3,715,070
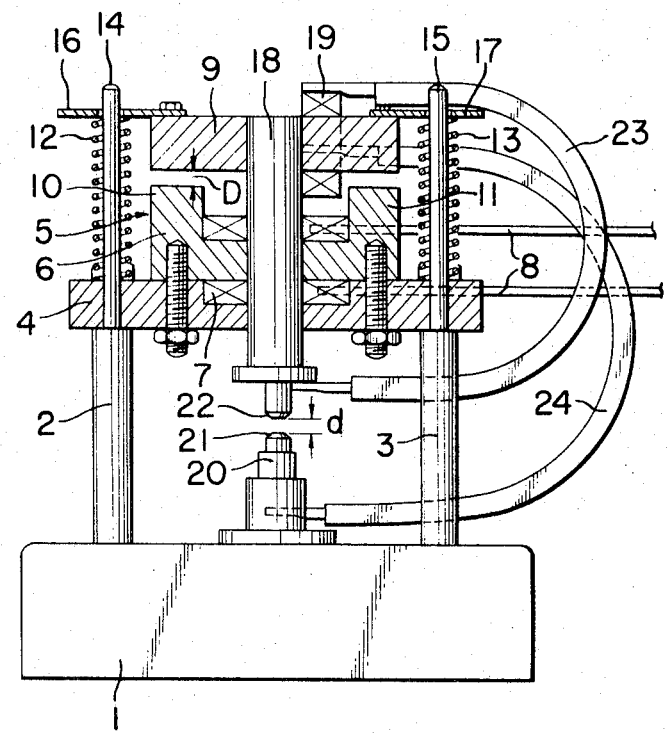
INVENTOR.
Akira Shibata
BY
Pierce, Scheffler & Parker
Attorneys

COLD WELDING MACHINE

This invention relates to a cold or percussive welding machine particularly suitable for bonding a train of electrical contacts of noble metal to a relatively thin strip of base metal such as of copper or copper alloy.

In cold welding for bonding different kinds of metals without fusion, it is necessary to upset and deform abutted metal pieces to a relatively large extent to expose sufficient new active surfaces. However, owing to the heavy cold working, the above bonding process leaves a great internal stress or strain in the metal which causes a separation of the bonded pieces. Annealing of the bonded pieces may be employed for releasing the above internal strain. But the application of annealing is unsatisfactory when one of the metal pieces is a spring member such as of phosphor bronz.

The principal object of the present invention is to overcome the above difficulty.

Application of cold welding is difficult when one or both of the metal pieces to be bonded have small thickness because exposure of active surfaces of the metal pieces cannot occur in a sufficient degree.

The other object of the present invention is to overcome this difficulty.

According to the present invention, there is provided a cold welding machine comprising an electromagnet, a ferromagnetic piece which will be drawn by the electromagnet, resilient means for urging the ferromagnetic piece away from the poles of the electromagnet, an induction coil of few turns electromagnetically coupled with the energizing coil of the electromagnet, a hammering member fixed to the ferromagnetic piece, an anvil adapted to cooperate with the hammering member, and electric conductors for applying voltage induced in the induction coil between the hammering member and the anvil for simultaneously releasing internal strain in the two metal pieces as they are upset.

The drawing is a vertical sectional view of an embodiment of the above cold welding machine according to the present invention.

Hereafter the present invention will be explained referring to this embodiment.

The machine shown in the drawing is provided with a bed 1 as a stationary foundation member. Four pillars are erected on the bed 1. Among of these pillars, two pillars 2, 3 are shown. A base plate 4 is fixed to the pillars at their upper portions. A yoke 6 of an electromagnet 5 is fixed onto the base plate 4. 7 is an energizing coil of the electromagnet and 8 are bus bars connecting the coil 7 to an electric source. On the bus bars 8 there is provided with a suitable switching means not shown.

An iron piece 9 is provided bridging two poles 10, 11 of the electromagnet 5. The iron piece 9 is drawn to the poles 10, 11 when the coil 7 is energized, but it is maintained away from the poles 10, 11 by coil springs 12, 13 to an extent of D when the coil 7 is deenergized. The coil springs 12, 13 are arranged concentrically with guide bars 14, 15 fixed to the base plate 4, and the upper ends of these coil springs support the iron piece 9 and a hammering member 18 fixed to the piece 9 by means of plates 16, 17 attached to the piece 9. The hammering member 18 is made of non-magnetic metal.

An induction coil 19 of few turns, such as of one turn, is provided on the iron piece 9. This coil 19 is the secondary winding of the special transformer consisting of the electromagnet 5 and the iron piece 9. The induction coil 19 may be wound on the yoke 6 of the electromagnet 5.

An anvil 20 is provided coaxially with the hammering member 18 on the bed 1. The distance d between the working upper surface 21 of the anvil 20 and the working lower end surface 22 of the hammering member 18 may be adjustable. The working surfaces 21, 22 are made of hard metal. Flexible bus bars 23, 24 are provided to apply the voltage induced in the induction coil 19 wound on the iron piece 9 between the hammering member 18 and the anvil 20.

Two metal pieces to be bonded are positioned on the upper surface 21 of the anvil 20 and the cold welding of these pieces is carried out by closing the energizing circuit of electromagnet 5, that is to say, by operating the switching means on the lines of bus bars 8. The switching means may be operated by means of a control circuit under a predetermined time interval.

The machine heretofore described has two functions. One of them is that of the electromagnet 5 which draws the iron piece 9 so as to carry out the upsetting of the metal pieces. And the other of them is that of the transformer consisting of the electromagnet 5, the iron piece 9 and the induction coil 19. The yoke 6 of the electromagnet 5 and the iron piece 9 provide a core of the transformer, and the energizing coil 7 and the induction coil 19 provide the primary winding and the secondary winding of the transformer respectively. The above two functions of the machine occur simultaneously, but speaking in detail, the function as the transformer is especially predominant and strong when the dimension D approaches zero.

Accordingly, the bonding process of the metal pieces may be roughly divided into the following two steps.
1. Plastic deformation of the metal pieces which is caused by the downward motion of the hammering member 18.
2. Heating of the metal pieces under their heavily compressed condition by an electric current flowing through them sufficient to relieve internal stress.

Among these steps, the first step corresponds to an upsetting step of an ordinary cold or percussive welding. On the other hand, the second step is one which should be distinguished from an ordinary annealing process, because this step is carried out without releasing the force impressed by the hammering member 18. In the case of the ordinary cold welding, as the bonded metal pieces are annealed, after a lapse of time, for releasing internal strain in the metal pieces, the internal strain is sufficient to damage the state of bonding of the metal pieces during the lapse of of the above time. The damage to the state of bonding is especially large in the early portion of the above lapse of time. In the case of the second step above mentioned, the internal strain is removed during bonding so that the state of bonding of the metal pieces is even improved.

For many cases, total reduction of thickness $\Delta t$ of the metal pieces must be at least 20 percent of the total thickness $t$ of the metal pieces. In other words, $D$ and $d$ are selected suitably satisfying the relation of $D-(d-t) \geq 0.2\ t$. Impact force for upsetting the metal pieces may be increased or decreased by varying the value D and d. The machine according to the present invention can be used widely except for hard and brittle metals such as pure tungsten or for soft metals such as pure lead.

What I claim is:

1. A cold welding machine comprising an electromagnet having an energizing coil, a ferromagnetic piece adapted to be drawn by said electromagenet, resilient means for normally maintaining said ferromagnetic piece spaced from the poles of said electromagnet, an induction coil of few turns electromagnetically coupled with the energizing coil of said electromagnet, a hammering member fixed to said ferromagnetic piece, an anvil adapted to cooperate with said hammering member for upsetting the metal pieces to be bonded, and electric conductors for applying the voltage induced in said induction coil between said hammering mamber and said anvil for simultaneously releasing internal strain in the metal pieces as they are bonded.

2. A cold welding machine according to claim 1 and further comprising means for adjusting the distance between said anvil and said hammering member.

3. A cold welding machine according to claim 1 wherein said induction coil is wound on said ferromagnetic piece.

4. A cold welding machine according to claim 1 wherein said induction coil is wound on the yoke of said electromagnet.

* * * * *